United States Patent
Wang

(10) Patent No.: US 9,999,047 B2
(45) Date of Patent: Jun. 12, 2018

(54) COMMUNICATION METHOD, BASE STATION, AND USER EQUIPMENT

(71) Applicant: Huawei Device Co., Ltd., Shenzhen (CN)

(72) Inventor: Jian Wang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 172 days.

(21) Appl. No.: 15/028,368

(22) PCT Filed: Oct. 25, 2013

(86) PCT No.: PCT/CN2013/085955
§ 371 (c)(1),
(2) Date: Apr. 8, 2016

(87) PCT Pub. No.: WO2015/058405
PCT Pub. Date: Apr. 30, 2015

(65) Prior Publication Data
US 2016/0262150 A1    Sep. 8, 2016

(51) Int. Cl.
*H04W 72/04* (2009.01)
*H04L 5/14* (2006.01)
*H04L 1/18* (2006.01)

(52) U.S. Cl.
CPC ....... *H04W 72/0446* (2013.01); *H04L 1/1854* (2013.01); *H04L 5/14* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 9,172,519 B2 * | 10/2015 | Seo | H04L 1/1607 |
| 2011/0107170 A1 | 5/2011 | Park et al. | |
| 2015/0055519 A1 | 2/2015 | Lin et al. | |
| 2015/0085718 A1 * | 3/2015 | Chen | H04B 7/2656 370/280 |
| 2015/0207594 A1 | 7/2015 | Si et al. | |

(Continued)

FOREIGN PATENT DOCUMENTS

| | | |
|---|---|---|
| CN | 103312470 A | 9/2013 |
| CN | 103368707 A | 10/2013 |

(Continued)

OTHER PUBLICATIONS

ETRI; "Downlink HARQ Timing in TDD-FDD Carrier Aggregation"; 3GPP TSG RAN WG1 Meeting #74bis; R1-134330; Guangzhou, China; Oct. 7-11, 2013; 4 pages.

(Continued)

*Primary Examiner* — Saba Tsegaye

(57) ABSTRACT

A communication method includes: determining a correspondence between Y uplink subframes and X downlink subframes, where the Y uplink subframes are used to respectively transmit HARQ information that is corresponding to the X downlink subframes, at least one uplink subframe of the Y uplink subframes is an uplink subframe on an FDD carrier, and the X downlink subframes are downlink subframes in one radio frame on a TDD carrier; and communicating with UE according to the correspondence.

10 Claims, 3 Drawing Sheets

(56) References Cited

U.S. PATENT DOCUMENTS

| | | | |
|---|---|---|---|
| 2016/0006552 A1 | 1/2016 | Seo et al. | |
| 2016/0174212 A1 | 6/2016 | Yang et al. | |
| 2016/0182211 A1* | 6/2016 | Choi | H04W 72/1278 370/280 |
| 2017/0163389 A1* | 6/2017 | Fu | H04L 1/1861 |

FOREIGN PATENT DOCUMENTS

| | | |
|---|---|---|
| EP | 3029874 A1 | 6/2016 |
| JP | 2016531490 A | 10/2016 |
| WO | 2012/124980 A2 | 9/2012 |
| WO | 2012124980 A2 | 9/2012 |
| WO | 2014173351 A1 | 10/2014 |

OTHER PUBLICATIONS

LG Electronics; "HARQ Timing for TDD-FDD Carrier Aggregation"; 3GPP TSG RAN WG1 Meeting #74bis; R1-134396; Guangzhou, China; Oct. 7-11, 2013; 6 pages.

\* cited by examiner

COMMUNICATION METHOD, BASE STATION, AND USER EQUIPMENT

CROSS REFERENCE TO RELATED APPLICATIONS

The present application claims priority under 35 U.S.C. § 365 to International Patent Application No. PCT/CN2013/085955 filed Oct. 25, 2013 and which is incorporated herein by reference into the present disclosure as if fully set forth herein.

TECHNICAL FIELD

The present invention relates to the communications field, and specifically, relates to a communication method, a base station, and user equipment.

BACKGROUND

In a communications system, after receiving data in a downlink subframe, user equipment (User Equipment, UE) feeds back, in an uplink subframe, hybrid automatic repeat request (Hybrid Automatic Repeat Request) information corresponding to the data to a base station.

In a time division duplex (Time Division Duplexing, TDD) system, a quantity of uplink subframes is different from a quantity of downlink subframes, and therefore, a binding (Boulding) or multiplexing (Multiplexing) manner is generally used to feed back HARQ information. Specifically, UE binds or multiplexes HARQ information corresponding to multiple downlink subframes together, and then transmits the HARQ information in one uplink subframe to a base station. Although this feedback manner can implement feedback of HARQ information in a TDD system, feedback performance is relatively poor. This affects a system throughput.

SUMMARY

A communication method, a base station, and user equipment provided in embodiments of the present invention can improve performance in HARQ information feedback and increase a system throughput.

According to a first aspect, a communication method is provided, including: determining a correspondence between Y uplink subframes and X downlink subframes, where the Y uplink subframes are used to respectively transmit hybrid automatic repeat request HARQ information that is corresponding to the X downlink subframes, at least one uplink subframe of the Y uplink subframes is an uplink subframe on a frequency division duplex FDD carrier, the X downlink subframes are downlink subframes in one radio frame on a time division duplex TDD carrier, and both X and Y are positive integers; and communicating with user equipment UE according to the correspondence.

With reference to the first aspect, in a first possible implementation manner, the determining a correspondence between Y uplink subframes and X downlink subframes includes: determining an uplink UL/downlink DL configuration mode of the radio frame, where the UL/DL configuration mode corresponds to the correspondence in a one-to-one manner.

With reference to the first possible implementation manner of the first aspect, in a second possible implementation manner, before communicating with the UE according to the correspondence, further includes: sending first signaling to the UE, where the first signaling is used to indicate the UL/DL configuration mode.

With reference to the first aspect or the first possible implementation manner or the second possible implementation manner of the first aspect, in a third possible implementation manner, the Y uplink subframes correspond to the X downlink subframes in a one-to-one manner.

With reference to the third possible implementation manner of the first aspect, in a fourth possible implementation manner, all the Y uplink subframes are uplink subframes on the FDD carrier.

With reference to the fourth possible implementation manner of the first aspect, in a fifth possible implementation manner, in a case in which the UL/DL configuration mode of the radio frame is a following UL/DL configuration mode, the correspondence between the Y uplink subframes and the X downlink subframes is as follows:

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F | | | | 4,F | 4,F | | | | 4,F |
| 1 | 4,F | | | 4,F | 4,F | 4,F | | | 4,F | 4,F |
| 2 | 4,F | | 4,F | 4,F | 4,F | 4,F | | 4,F | 4,F | 4,F |
| 3 | 4,F | 4,F | 4,F | 4,F | 4,F | 4,F | | | | 4,F |
| 4 | 4,F | 4,F | 4,F | 4,F | 4,F | 4,F | | | 4,F | 4,F |
| 5 | 4,F | 4,F | 4,F | 4,F | 4,F | 4,F | | 4,F | 4,F | 4,F |
| 6 | 4,F | | | 4,F | 4,F | 4,F | | | | 4,F | where "4,F" indicates that a downlink subframe corresponding to an uplink subframe n is the fourth subframe prior to a subframe n on the TDD carrier, and n is any element in a set {0,1,2,3,4,5,6,7,8,9}.

With reference to the third possible implementation manner of the first aspect, in a sixth possible implementation manner, the Y uplink subframes include a first-type uplink subframe and a second-type uplink subframe, where the first-type uplink subframe is an uplink subframe on the FDD carrier, and the second-type uplink subframe is an uplink subframe on the TDD carrier.

With reference to the sixth possible implementation manner of the first aspect, in a seventh possible implementation manner, in a case in which the UL/DL configuration mode of the radio frame is a following UL/DL configuration mode, the correspondence between the Y uplink subframes and the X downlink subframes is as follows:

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F | | | | 4 | 4,F | | | | 4 |
| 1 | 4,F | | | 4 | 4,F | 4,F | | | 4 | 4,F |
| 2 | 4,F | | 4 | 4,F | 4,F | 4,F | | 4 | 4,F | 4,F |
| 3 | 4,F | 4,F | 4 | 4 | 4 | 4,F | | | | 4,F |
| 4 | 4,F | 4,F | 4 | 4 | 4,F | 4,F | | | 4,F | 4,F |
| 5 | 4,F | 4,F | 4 | 4,F | 4,F | 4,F | | 4,F | 4,F | 4,F |
| 6 | 4,F | | | 4 | 4 | 4,F | | | | 4,F | where an uplink subframe n corresponding to "4,F" belongs to the first-type uplink subframe and "4,F" indicates that a downlink subframe corresponding to the uplink subframe n is the fourth subframe prior to a subframe n on the TDD carrier; an uplink subframe n corresponding to "4" belongs to the second-type uplink subframe and "4" indicates that a downlink subframe corresponding to the uplink subframe n is the fourth subframe prior to a subframe n on the TDD carrier; and n is any element in a set {0,1,2,3,4,5,6,7,8,9}.

With reference to the first aspect or any one manner of the first possible implementation manner to the seventh possible implementation manner of the first aspect, in an eighth possible implementation manner, further includes: determining resource parameters respectively corresponding to the Y uplink subframes, where a resource parameter corresponding to the $y^{th}$ uplink subframe of the Y uplink subframes is used to indicate a start position of a resource that is in the $y^{th}$ uplink subframe and that is used to transmit HARQ information, where y is a positive integer with a value ranging from 1 to Y; and sending second signaling to the UE, where the second signaling includes the resource parameters respectively corresponding to the Y uplink subframes.

With reference to the eighth possible implementation manner of the first aspect, in a ninth possible implementation manner, the Y uplink subframes include a first-type uplink subframe and a second-type uplink subframe, where the first-type uplink subframe is an uplink subframe on the FDD carrier, and the second-type uplink subframe is an uplink subframe on the TDD carrier; and the determining resource parameters respectively corresponding to the Y uplink subframes includes: determining a resource parameter respectively corresponding to the first-type uplink subframe, and determining a resource parameter respectively corresponding to the second-type uplink subframe.

With reference to the eighth possible implementation manner or the ninth possible implementation manner of the first aspect, in a tenth possible implementation manner, further includes: determining, according to the following equation, a position of a resource that is in the $y^{th}$ uplink subframe and used to transmit HARQ information:

$$n_{PUCCH\text{-}subframe(y)}^{(1,\tilde{p}0)} = n_{CCE} + N_{PUCCH\text{-}subframe(y)}^{(1)},$$

or $$n_{PUCCH\text{-}subframe(y)}^{(1,\tilde{p}0)} = n_{CCE} + 1 + N_{PUCCH\text{-}subframe(y)}^{(1)},$$

where $n_{PUCCH\text{-}subframe(y)}^{(1,\tilde{p}0)}$ represents the position of the resource that is in the $y^{th}$ uplink subframe and used to transmit HARQ information, $N_{PUCCH\text{-}subframe(y)}^{(1)}$ represents the resource parameter corresponding to the $y^{th}$ uplink subframe, and $n_{CCE}$ represents a number of the first control channel element CCE in a resource occupied by downlink control information that is used for scheduling the UE.

According to a second aspect, a communication method is provided, including: determining a correspondence between Y uplink subframes and X downlink subframes, where the Y uplink subframes are used to respectively transmit hybrid automatic repeat request HARQ information that is corresponding to the X downlink subframes, at least one uplink subframe of the Y uplink subframes is an uplink subframe on a frequency division duplex FDD carrier, the X downlink subframes are downlink subframes in one radio frame on a time division duplex TDD carrier, and both X and Y are positive integers; and communicating with a base station according to the correspondence.

With reference to the second aspect, in a first possible implementation manner, the determining a correspondence between Y uplink subframes and X downlink subframes includes: receiving first signaling from the base station, where the first signaling is used to indicate an uplink UL/downlink DL configuration mode of the radio frame, where the UL/DL configuration mode corresponds to the correspondence in a one-to-one manner; and determining the correspondence according to the UL/DL configuration mode.

With reference to the second aspect or the first possible implementation manner of the second aspect, in a second possible implementation manner, the Y uplink subframes correspond to the X downlink subframes in a one-to-one manner.

With reference to the second possible implementation manner of the second aspect, in a third possible implementation manner, all the Y uplink subframes are uplink subframes on the FDD carrier.

With reference to the third possible implementation manner of the second aspect, in a fourth possible implementation manner, in a case in which the UL/DL configuration mode of the radio frame is a following UL/DL configuration mode, the correspondence between the Y uplink subframes and the X downlink subframes is as follows:

| UL/DL configuration | Uplink subframe n | | | | | | | | | |
|---|---|---|---|---|---|---|---|---|---|---|
| mode | 0 | 1 | 2 | 3 | 4 | 5 | 6 | 7 | 8 | 9 |
| 0 | 4,F | | | | 4,F | 4,F | | | | 4,F |
| 1 | 4,F | | | 4,F | 4,F | 4,F | | | 4,F | 4,F |
| 2 | 4,F | | 4,F | 4,F | 4,F | 4,F | | 4,F | 4,F | 4,F |
| 3 | 4,F | 4,F | 4,F | 4,F | 4,F | 4,F | | | | 4,F |
| 4 | 4,F | 4,F | 4,F | 4,F | 4,F | 4,F | | | 4,F | 4,F |
| 5 | 4,F | 4,F | 4,F | 4,F | 4,F | 4,F | | 4,F | 4,F | 4,F |
| 6 | 4,F | | | 4,F | 4,F | 4,F | | | | 4,F | where "4,F" indicates that a downlink subframe corresponding to an uplink subframe n is the fourth subframe prior to a subframe n on the TDD carrier, and n is any element in a set {0,1,2,3,4,5,6,7,8,9}.

With reference to the second possible implementation manner of the second aspect, in a fifth possible implementation manner, the Y uplink subframes include a first-type uplink subframe and a second-type uplink subframe, where the first-type uplink subframe is an uplink subframe on the FDD carrier, and the second-type uplink subframe is an uplink subframe on the TDD carrier.

With reference to the fifth possible implementation manner of the second aspect, in a sixth possible implementation manner, in a case in which the UL/DL configuration mode of the radio frame is a following UL/DL configuration mode, the correspondence between the Y uplink subframes and the X downlink subframes is as follows:

| UL/DL configuration | Uplink subframe n | | | | | | | | | |
|---|---|---|---|---|---|---|---|---|---|---|
| mode | 0 | 1 | 2 | 3 | 4 | 5 | 6 | 7 | 8 | 9 |
| 0 | 4,F | | | | 4 | 4,F | | | | 4 |
| 1 | 4,F | | | 4 | 4,F | 4,F | | | 4 | 4,F |
| 2 | 4,F | | 4 | 4,F | 4,F | 4,F | | 4 | 4,F | 4,F |
| 3 | 4,F | 4,F | 4 | 4 | 4 | 4,F | | | | 4,F |
| 4 | 4,F | 4,F | 4 | 4 | 4,F | 4,F | | | 4,F | 4,F |
| 5 | 4,F | 4,F | 4 | 4,F | 4,F | 4,F | | 4,F | 4,F | 4,F |
| 6 | 4,F | | | 4 | 4 | 4,F | | | | 4,F | where an uplink subframe n corresponding to "4,F" belongs to the first-type uplink subframe and "4,F" indicates that a downlink subframe corresponding to the uplink subframe n is the fourth subframe prior to a subframe n on the TDD carrier; an uplink subframe n corresponding to "4"

belongs to the second-type uplink subframe and "4" indicates that a downlink subframe corresponding to the uplink subframe n is the fourth subframe prior to a subframe n on the TDD carrier; and n is any element in a set {0,1,2,3,4,5, 6,7,8,9}.

With reference to the second aspect or any one manner of the first possible implementation manner to the sixth possible implementation manner of the second aspect, in a seventh possible implementation, further includes: receiving second signaling from the base station, where the second signaling includes resource parameters respectively corresponding to the Y uplink subframes, and a resource parameter corresponding to the $y^{th}$ uplink subframe of the Y uplink subframes is used to indicate a start position of a resource that is in the $y^{th}$ uplink subframe and that is used to transmit HARQ information, where y is a positive integer with a value ranging from 1 to Y; and the communicating with a base station according to the correspondence includes: communicating with the base station according to the correspondence and the resource parameters respectively corresponding to the Y uplink subframes.

With reference to the seventh possible implementation manner of the second aspect, in an eighth possible implementation manner, further includes: determining, according to the following equation, a position of a resource that is in the $y^{th}$ uplink subframe and used to transmit HARQ information:

$$n_{PUCCH\text{-}subframe(y)}^{(1,\tilde{p}0)} = n_{CCE} + N_{PUCCH\text{-}subframe(y)}^{(1)},$$

or $$n_{PUCCH\text{-}subframe(y)}^{(1,\tilde{p}0)} = n_{CCE} + 1 + N_{PUCCH\text{-}subframe(y)}^{(1)},$$

where $n_{PUCCH\text{-}subframe(y)}^{(1,\tilde{p}0)}$ represents the position of the resource that is in the $y^{th}$ uplink subframe and used to transmit HARQ information, $N_{PUCCH\text{-}subframe(y)}^{(1)}$ represents the resource parameter corresponding to the $y^{th}$ uplink subframe, and $n_{CCE}$ represents a number of the first control channel element CCE in a resource occupied by downlink control information that is used for scheduling.

According to a third aspect, a base station is provided, including: a determining unit, configured to determine a correspondence between Y uplink subframes and X downlink subframes, where the Y uplink subframes are used to respectively transmit hybrid automatic repeat request HARQ information that is corresponding to the X downlink subframes, at least one uplink subframe of the Y uplink subframes is an uplink subframe on a frequency division duplex FDD carrier, the X downlink subframes are downlink subframes in one radio frame on a time division duplex TDD carrier, and both X and Y are positive integers; and a communication unit, configured to communicate with user equipment UE according to the correspondence.

With reference to the third aspect, in a first possible implementation manner, the determining unit is specifically configured to determine an uplink UL/downlink DL configuration mode of the radio frame, where the UL/DL configuration mode corresponds to the correspondence in a one-to-one manner.

With reference to the first possible implementation manner of the third aspect, in a second possible implementation manner, the communication unit is further configured to: before communicating with the UE according to the correspondence, send first signaling to the UE, where the first signaling is configured to indicate the UL/DL configuration mode.

With reference to the third aspect or the first possible implementation manner or the second possible implementation manner of the third aspect, in a third possible implementation manner, the Y uplink subframes correspond to the X downlink subframes in a one-to-one manner.

With reference to the third possible implementation manner of the third aspect, in a fourth possible implementation manner, all the Y uplink subframes are uplink subframes on the FDD carrier; and in a case in which the UL/DL configuration mode of the radio frame is a following UL/DL configuration mode, the correspondence between the Y uplink subframes and the X downlink subframes is as follows:

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F | | | | 4,F | 4,F | | | | 4,F |
| 1 | 4,F | | | 4,F | 4,F | 4,F | | | 4,F | 4,F |
| 2 | 4,F | | 4,F | 4,F | 4,F | 4,F | | 4,F | 4,F | 4,F |
| 3 | 4,F | 4,F | 4,F | 4,F | 4,F | 4,F | | | | 4,F |
| 4 | 4,F | 4,F | 4,F | 4,F | 4,F | 4,F | | | 4,F | 4,F |
| 5 | 4,F | 4,F | 4,F | 4,F | 4,F | 4,F | | 4,F | 4,F | 4,F |
| 6 | 4,F | | | 4,F | 4,F | 4,F | | | | 4,F | where "4,F" indicates that a downlink subframe corresponding to an uplink subframe n is the fourth subframe prior to a subframe n on the TDD carrier, and n is any element in a set {0,1,2,3,4,5,6,7,8,9}.

With reference to the third possible implementation manner of the third aspect, in a fifth possible implementation manner, the Y uplink subframes include a first-type uplink subframe and a second-type uplink subframe, where the first-type uplink subframe is an uplink subframe on the FDD carrier, and the second-type uplink subframe is an uplink subframe on the TDD carrier; and in a case in which the UL/DL configuration mode of the radio frame is a following UL/DL configuration mode, the correspondence between the Y uplink subframes and the X downlink subframes is as follows:

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F | | | | 4 | 4,F | | | | 4 |
| 1 | 4,F | | | 4 | 4,F | 4,F | | | 4 | 4,F |
| 2 | 4,F | | 4 | 4,F | 4,F | 4,F | | 4 | 4,F | 4,F |
| 3 | 4,F | 4,F | 4 | 4 | 4 | 4,F | | | | 4,F |
| 4 | 4,F | 4,F | 4 | 4 | 4,F | 4,F | | | 4,F | 4,F |
| 5 | 4,F | 4,F | 4 | 4,F | 4,F | 4,F | | 4,F | 4,F | 4,F |
| 6 | 4,F | | | 4 | 4 | 4,F | | | | 4,F | where an uplink subframe n corresponding to "4,F" belongs to the first-type uplink subframe and "4,F" indicates that a downlink subframe corresponding to the uplink subframe n is the fourth subframe prior to a subframe n on the TDD carrier; an uplink subframe n corresponding to "4" belongs to the second-type uplink subframe and "4" indicates that a downlink subframe corresponding to the uplink subframe n is the fourth subframe prior to a subframe n on the TDD carrier; and n is any element in a set {0,1,2,3,4,5, 6,7,8,9}.

With reference to the third aspect or any one manner of the first possible implementation manner to the fifth possible implementation manner of the third aspect, in a sixth possible implementation manner, the determining unit is further configured to determine resource parameters respectively corresponding to the Y uplink subframes, where a resource parameter corresponding to the y$^{th}$ uplink subframe of the Y uplink subframes is used to indicate a start position of a resource that is in the y$^{th}$ uplink subframe and that is used to transmit HARQ information, where y is a positive integer with a value ranging from 1 to Y; and the communication unit is further configured to send second signaling to the UE, where the second signaling includes the resource parameters respectively corresponding to the Y uplink subframes.

With reference to the sixth possible implementation manner of the third aspect, in a seventh possible implementation manner, the determining unit is further configured to determine, according to the following equation, a position of a resource that is in the y$^{th}$ uplink subframe and used to transmit HARQ information:

$$n_{PUCCH\text{-}subframe(y)}^{(1,\tilde{p}0)} = n_{CCE} + N_{PUCCH\text{-}subframe(y)}^{(1)},$$

or $$n_{PUCCH\text{-}subframe(y)}^{(1,\tilde{p}0)} = n_{CCE} + 1 + N_{PUCCH\text{-}subframe(y)}^{(1)},$$

where $n_{PUCCH\text{-}subframe(y)}^{(1,\tilde{p}0)}$ represents the position of the resource that is in the y$^{th}$ uplink subframe and used to transmit HARQ information, $N_{PUCCH\text{-}subframe(y)}^{(1)}$ represents the resource parameter corresponding to the y$^{th}$ uplink subframe, and $n_{CCE}$ represents a number of the first control channel element CCE in a resource occupied by downlink control information that is used for scheduling the UE.

According to a fourth aspect, user equipment is provided, including: a determining unit, configured to determine a correspondence between Y uplink subframes and X downlink subframes, where the Y uplink subframes are used to respectively transmit hybrid automatic repeat request HARQ information that is corresponding to the X downlink subframes, at least one uplink subframe of the Y uplink subframes is an uplink subframe of a frequency division duplex FDD carrier, the X downlink subframes are downlink subframes in one radio frame on a time division duplex TDD carrier, and both X and Y are positive integers; and a communication unit, configured to communicate with a base station according to the correspondence.

With reference to the fourth aspect, in a first possible implementation manner, the communication unit is further configured to receive first signaling from the base station, where the first signaling is used to indicate an uplink UL/downlink DL configuration mode of the radio frame, where the UL/DL configuration mode corresponds to the correspondence in a one-to-one manner; and the determining unit is further configured to determine the correspondence according to the UL/DL configuration mode.

With reference to the fourth aspect or the first possible implementation manner of the fourth aspect, in a second possible implementation manner, the Y uplink subframes correspond to the X downlink subframes in a one-to-one manner.

With reference to the second possible implementation manner of the fourth aspect, in a third possible implementation manner, all the Y uplink subframes are uplink subframes on the FDD carrier; and in a case in which the UL/DL configuration mode of the radio frame is a following UL/DL configuration mode, the correspondence between the Y uplink subframes and the X downlink subframes is as follows:

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F | | | | 4,F | 4,F | | | | 4,F |
| 1 | 4,F | | | 4,F | 4,F | 4,F | | | 4,F | 4,F |
| 2 | 4,F | | 4,F | 4,F | 4,F | 4,F | | 4,F | 4,F | 4,F |
| 3 | 4,F | 4,F | 4,F | 4,F | 4,F | 4,F | | | | 4,F |
| 4 | 4,F | 4,F | 4,F | 4,F | 4,F | 4,F | | | 4,F | 4,F |
| 5 | 4,F | 4,F | 4,F | 4,F | 4,F | 4,F | | 4,F | 4,F | 4,F |
| 6 | 4,F | | | 4,F | 4,F | 4,F | | | | 4,F | where "4,F" indicates that a downlink subframe corresponding to an uplink subframe n is the fourth subframe prior to a subframe n on the TDD carrier, and n is any element in a set {0,1,2,3,4,5,6,7,8,9}.

With reference to the second possible implementation manner of the fourth aspect, in a fourth possible implementation manner, the Y uplink subframes include a first-type uplink subframe and a second-type uplink subframe, where the first-type uplink subframe is an uplink subframe on the FDD carrier, and the second-type uplink subframe is an uplink subframe on the TDD carrier; and in a case in which the UL/DL configuration mode of the radio frame is a following UL/DL configuration mode, the correspondence between the Y uplink subframes and the X downlink subframes is as follows:

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F | | | | 4 | 4,F | | | | 4 |
| 1 | 4,F | | | 4 | 4,F | 4,F | | | 4 | 4,F |
| 2 | 4,F | | 4 | 4,F | 4,F | 4,F | | 4 | 4,F | 4,F |
| 3 | 4,F | 4,F | 4 | 4 | 4 | 4,F | | | | 4,F |
| 4 | 4,F | 4,F | 4 | 4 | 4,F | 4,F | | | 4,F | 4,F |
| 5 | 4,F | 4,F | 4 | 4,F | 4,F | 4,F | | 4,F | 4,F | 4,F |
| 6 | 4,F | | | 4 | 4 | 4,F | | | | 4,F | where an uplink subframe n corresponding to "4,F" belongs to the first-type uplink subframe and "4,F" indicates that a downlink subframe corresponding to the uplink subframe n is the fourth subframe prior to a subframe n on the TDD carrier; an uplink subframe n corresponding to "4" belongs to the second-type uplink subframe and "4" indicates that a downlink subframe corresponding to the uplink subframe n is the fourth subframe prior to a subframe n on the TDD carrier; and n is any element in a set {0,1,2,3,4,5,6,7,8,9}.

With reference to the fourth aspect or any one manner of the first possible implementation manner to the fourth possible implementation manner of the fourth aspect, in a fifth possible implementation manner, the communication unit is further configured to receive second signaling from the base station, where the second signaling includes resource parameters respectively corresponding to the Y uplink subframes, and a resource parameter corresponding to the y$^{th}$ uplink subframe of the Y uplink subframes is used to indicate a start position of a resource that is in the y$^{th}$ uplink subframe and that is used to transmit HARQ information, where y is a positive integer with a value ranging from 1 to Y; and the communication unit is specifically configured to communicate with the base station according to the correspondence and the resource parameters respectively corresponding to the Y uplink subframes.

With reference to the fifth possible implementation manner of the fourth aspect, in a sixth possible implementation manner, the determining unit is further configured to determine, according to the following equation, a position of a resource that is in the $y^{th}$ uplink subframe and used to transmit HARQ information:

$$n_{PUCCH\text{-}subframe(y)}^{(1,\tilde{p}0)} = n_{CCE} + N_{PUCCH\text{-}subframe(y)}^{(1)},$$

or $$n_{PUCCH\text{-}subframe(y)}^{(1,\tilde{p}0)} = n_{CCE} + 1 + N_{PUCCH\text{-}subframe(y)}^{(1)},$$

where $n_{PUCCH\text{-}subframe(y)}^{(1,\tilde{p}0)}$ represents the position of the resource that is in the $y^{th}$ uplink subframe and used to transmit HARQ information, $N_{PUCCH\text{-}subframe(y)}^{(1)}$ represents the resource parameter corresponding to the $y^{th}$ uplink subframe, and $n_{CCE}$ represents a number of the first control channel element CCE in a resource occupied by downlink control information that is used for scheduling.

In the embodiments of the present invention, a correspondence between Y uplink subframes and X downlink subframes is determined, where the X downlink subframes are downlink subframes on a TDD carrier, and at least one uplink subframe of the Y uplink subframes is an uplink subframe on an FDD carrier, so that HARQ information can be fed back for a downlink subframe on the TDD carrier in conjunction with an uplink subframe on the FDD carrier. This can improve performance in HARQ information feedback and can increase a system throughput.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (Global System of Mobile communication, GSM), a Code Division Multiple Access (Code Division Multiple Access, CDMA) system, Wideband Code Division Multiple Access (Wideband Code Division Multiple Access Wireless, WCDMA), a general packet radio service (General Packet Radio Service, GPRS), and Long Term. Evolution (Long Term Evolution, LTE).

User equipment (User Equipment, UE), also referred to as a mobile terminal (Mobile Terminal, MT), mobile user equipment, and the like, may communicate with one or more core networks by using a radio access network (for example, Radio Access Network, RAN). The user equipment may be a mobile terminal, such as a mobile phone (also referred to as a "cellular" phone) and a computer provided with a mobile terminal. For example, the user equipment may be a portable, pocket-sized, handheld, computer built-in, or in-vehicle mobile apparatus, which exchanges language and/or data with the radio access network.

Abase station may be abase station (Base Transceiver Station, BTS) in GSM or CDMA, may be a base station (NodeB) in WCDMA, or may be an evolved NodeB (evolved Node B, eNB, or e-NodeB) in LTE, which is not limited in the present invention.

Figure 1:
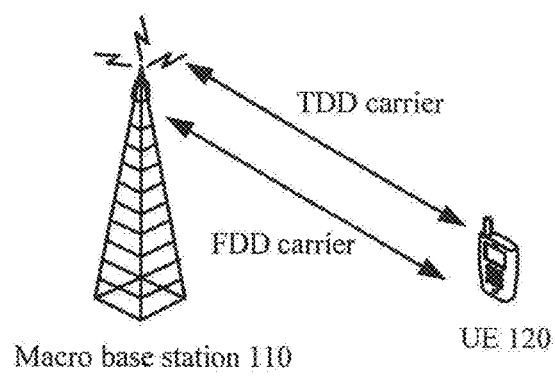
FIG. 1 is a schematic diagram of an example scenario to which an embodiment of the present invention is applicable.

FIG. 1 is a schematic diagram of an example scenario to which an embodiment of the present invention is applicable.

The Long Term Evolution (Long Term Evolution, LTE) system may be classified into an LTE-TDD system and an LTE-FDD system. The 3rd Generation Partnership Project (3rd Generation Partnership Project, 3GPP) proposes aggregation of the standardized LTE-TDD system and LTE-FDD system in LTE Release 12 (Release 12, Rel.12), that is, aggregation of a TDD carrier and an FDD carrier.

FIG. 1 shows a scenario of aggregation of a TDD carrier and an FDD carrier. As shown in FIG. 1, a TDD carrier and an FDD carrier may be configured in a macro base station 110. The macro base station 110 may communicate with UE 120 in a frequency division duplex (Frequency Division Duplexing, FDD) mode on one carrier, and communicate in a TDD mode on another carrier. In this scenario, at one time point, the macro base station 110 may perform downlink data transmission with the UE 120 in one of the modes.

Figure 2:
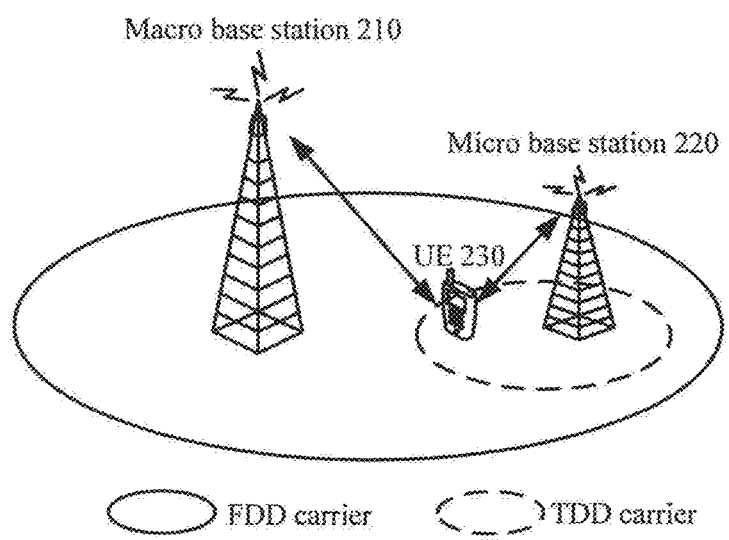
FIG. 2 is a schematic diagram of another example scenario to which an embodiment of the present invention is applicable.

FIG. 2 is a schematic diagram of another example scenario to which an embodiment of the present invention is applicable.

As shown in FIG. 2, an FDD carrier may be configured in a macro base station 210, and a TDD carrier may be configured in a micro base station 220. The macro base station 210 may communicate with UE 230 in an FDD mode, and the micro base station 220 may communicate with the UE 230 in a TDD mode.

Figure 3:
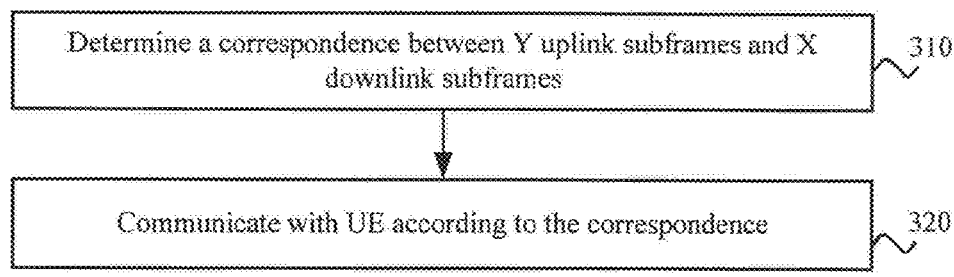
FIG. 3 is a schematic flowchart of a communication method according to an embodiment of the present invention.

FIG. 3 is a schematic flowchart of a communication method according to an embodiment of the present invention. The method of FIG. 3 is executed by a base station, for example, the macro base station 110 shown in FIG. 1, or the macro base station 210 or the micro base station 220 shown in FIG. 2.

310: Determine a correspondence between Y uplink subframes and X downlink subframes, where the Y uplink subframes are used to respectively transmit HARQ information that is corresponding to the X downlink subframes, at least one uplink subframe of the Y uplink subframes is an uplink subframe on an FDD carrier, the X downlink subframes are downlink subframes in one radio frame on a TDD carrier, and both X and Y are positive integers.

320: Communicate with UE according to the correspondence.

In this embodiment of the present invention, a correspondence between Y uplink subframes and X downlink subframes is determined, where the X downlink subframes are downlink subframes on a TDD carrier, and at least one uplink subframe of the Y uplink subframes is an uplink subframe on an FDD carrier, so that HARQ information can be fed back for a downlink subframe on the TDD carrier in conjunction with an uplink subframe on the FDD carrier. This can improve performance in HARQ information feedback and can increase a system throughput.

In this embodiment of the present invention, the X downlink subframes may be all downlink subframes in one radio frame on the TDD carrier, or may be some downlink subframes in one radio frame on the TDD carrier.

Each downlink subframe of the X downlink subframes has its corresponding HARQ information. The HARQ information corresponding to each downlink subframe may refer to HARQ information corresponding to data that is transmitted in the downlink subframe. The HARQ information may include acknowledgement (Acknowledgement, ACK) information and/or non-acknowledgement (Non-Acknowledgement, NACK) information.

It should be understood that, in this embodiment of the present invention, downlink subframes and special subframes on the TDD carrier may be collectively referred to as downlink subframes.

Optionally, in an embodiment, the Y uplink subframes may correspond to the X downlink subframes in a one-to-one manner.

For a TDD carrier, uplink subframes do not correspond to downlink subframes in a one-to-one manner; therefore, when HARQ information is fed back, one uplink subframe is usually used to feed back HARQ information corresponding to multiple downlink subframes. This results in poor feedback performance.

In this embodiment of the present invention, the Y uplink subframes correspond to the X downlink subframes in a one-to-one manner, that is, values of Y and X are the same. In this way, for one downlink subframe on the TDD carrier, there is one corresponding uplink subframe to feed back HARQ information for the downlink subframe, instead of feeding back HARQ information corresponding to multiple downlink subframes by using one uplink subframe. This can improve performance in HARQ information feedback and can thereby increase a system throughput.

Optionally, in an embodiment, in step 310, the base station may determine an uplink (Uplink, UL)/downlink (Downlink, DL) configuration mode of the radio frame, where the UL/DL configuration mode corresponds to the foregoing correspondence in a one-to-one manner.

Different UL/DL configuration modes are defined for the TDD carrier. These UL/DL configuration modes each are used to describe an allocation ratio of uplink subframes to downlink subframes in one radio frame. For example, as shown in Table 1, in an LTE system, for a TDD carrier, there are seven different UL/DL configuration modes

TABLE 1

UL/DL configuration modes of a TDD carrier

| UL/DL configuration mode | Subframe number (Subframe number) | | | | | | | | | |
|---|---|---|---|---|---|---|---|---|---|---|
| (UL/DL configuration) | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, "D" represents a downlink subframe, "S" represents a special subframe, and "U" represents an uplink subframe. In this embodiment of the present invention, "D" subframes and "S" subframes may be collectively referred to as downlink subframes.

Because a number of a downlink subframe or a quantity of downlink subframes in a radio frame changes when the foregoing different configuration modes are used for the radio frame, in step 310, specific content of the correspondence between the Y uplink subframes and the X downlink subframes may vary accordingly.

Each configuration mode may be associated with one correspondence. That is, the configuration mode may correspond to the foregoing correspondence in a one-to-one manner. Therefore, in step 310, after the UL/DL configuration mode used for the radio frame on the TDD carrier is determined, the correspondence between the Y uplink subframes and the X downlink subframes can be uniquely determined.

Optionally, in another embodiment, before step 320, the base station may send first signaling to the UE, where the first signaling may be used to indicate the UL/DL configuration mode.

The correspondence between the Y uplink subframes and the X downlink subframes that is associated with each UL/DL configuration mode may be predefined, and may be pre-stored by both the base station and the UE internally. Then, the base station may send first signaling to the UE, to indicate an UL/DL configuration mode currently used for the radio frame. In this case, the UE may determine, according to correspondences associated with different UL/DL configuration modes and according to the UL/DL configuration mode indicated by the first signaling, the correspondence between the Y uplink subframes and the X downlink subframes that is associated with the UL/DL configuration mode, so as to perform communication with the base station based on the correspondence.

For example, the first signaling may be high-layer signaling. For example, the first signaling may carry a configuration mode number shown in the leftmost column of Table 1, for example, one of 0 to 6.

Optionally, in another embodiment, in a case in which the Y uplink subframes correspond to the X downlink subframes in a one-to-one manner, all the Y uplink subframes are uplink subframes on the FDD carrier. Specifically, HARQ information corresponding to downlink subframes on the TDD carrier may be fed back by using the uplink subframes on the FDD carrier.

Optionally, in another embodiment, if all the Y uplink subframes are uplink subframes on the FDD carrier, in a case in which the UL/DL configuration mode of the radio frame is a following UL/DL configuration mode, the correspondence between the Y uplink subframes and the X downlink subframes may be shown in Table 2.

TABLE 2

Correspondence between uplink subframes and downlink subframes

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F |   |   |   | 4,F | 4,F |   |   |   | 4,F |
| 1 | 4,F |   |   | 4,F | 4,F | 4,F |   |   | 4,F | 4,F |
| 2 | 4,F |   | 4,F | 4,F | 4,F | 4,F |   | 4,F | 4,F | 4,F |
| 3 | 4,F | 4,F | 4,F | 4,F | 4,F | 4,F |   |   |   | 4,F |
| 4 | 4,F | 4,F | 4,F | 4,F | 4,F | 4,F |   |   | 4,F | 4,F |
| 5 | 4,F | 4,F | 4,F | 4,F | 4,F | 4,F | 4,F | 4,F | 4,F | 4,F |
| 6 | 4,F |   |   | 4,F | 4,F | 4,F |   |   |   | 4,F |

"4,F" may indicate that a downlink subframe corresponding to an uplink subframe n is the fourth subframe prior to a subframe n on the TDD carrier, and n is any element in a set {0,1,2,3,4,5,6,7, 8, 9}.

For example, as shown in Table 2, when the UL/DL configuration mode of the radio frame is UL/DL configuration mode 1, a downlink subframe corresponding to an uplink subframe 0 on the FDD carrier is the fourth subframe prior to a subframe 0 on the TDD carrier, that is, the uplink subframe 0 on the FDD carrier is used to transmit HARQ information corresponding to data of the fourth subframe prior to the subframe 0 on the TDD carrier. A downlink subframe corresponding to an uplink subframe 3 on the FDD carrier is the fourth subframe prior to a subframe 3 on the TDD carrier, that is, the uplink subframe on the FDD carrier is used to transmit HARQ information corresponding to data of the fourth subframe prior to the subframe 3 on the TDD carrier. Others are similar, and details are not further described.

It can be learned that downlink data for the UE on the TDD carrier is still transmitted by using downlink subframes on the TDD carrier, but HARQ feedback information corresponding to the data may be transmitted by using certain uplink subframes on the FDD carrier. For example, when the UL/DL configuration mode of the radio frame is UL/DL configuration mode 1, the UE may feedback HARQ information by using uplink subframes 0, 3, 4, 5, 8, and 9 on the FDD carrier.

Optionally, in another embodiment, in a case in which the Y uplink subframes correspond to the X downlink subframes in a one-to-one manner, the Y uplink subframes may include a first-type uplink subframe and a second-type uplink subframe, where the first-type uplink subframe is an uplink subframe on the FDD carrier, and the second-type uplink subframe is an uplink subframe on the TDD carrier.

Specifically, HARQ information corresponding to some downlink subframes on the TDD carrier may be fed back by using an uplink subframe on the FDD carrier, while HARQ information corresponding to other subframes on the TDD carrier may be fed back by using an uplink subframe on the TDD carrier.

Optionally, in another embodiment, if the Y uplink subframes include a first-type uplink subframe and a second-type uplink subframe, in a case in which the UL/DL configuration mode of the radio frame is a following UL/DL configuration mode, the correspondence between the Y uplink subframes and the X downlink subframes may be shown in Table 3.

TABLE 3

Correspondence between uplink subframes and downlink subframes

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F |   |   |   | 4 | 4,F |   |   |   | 4 |
| 1 | 4,F |   |   | 4 | 4,F | 4,F |   |   | 4 | 4,F |
| 2 | 4,F |   | 4 | 4,F | 4,F | 4,F |   | 4 | 4,F | 4,F |
| 3 | 4,F | 4,F | 4 | 4 | 4 | 4,F |   |   |   | 4,F |
| 4 | 4,F | 4,F | 4 | 4 | 4,F | 4,F |   |   | 4,F | 4,F |
| 5 | 4,F | 4,F | 4 | 4,F | 4,F | 4,F |   | 4,F | 4,F | 4,F |
| 6 | 4,F |   |   | 4 | 4 | 4,F |   |   |   | 4,F |

An uplink subframe n corresponding to "4,F" belongs to the first-type uplink subframe and "4,F" may indicate that a downlink subframe corresponding to the uplink subframe n is the fourth subframe prior to a subframe n on the TDD carrier; an uplink subframe n corresponding to "4" belongs to the second-type uplink subframe and "4" may indicate that a downlink subframe corresponding to the uplink subframe n is the fourth subframe prior to a subframe n on the TDD carrier; n is any element in a set {0,1,2,3,4,5,6,7,8,9}.

For example, as shown in Table 3, when the UL/DL configuration mode of the radio frame is UL/DL configuration mode 1, an uplink subframe 0 belongs to the FDD carrier, and an uplink subframe 3 belongs to the TDD carrier. Specifically, a downlink subframe corresponding to the uplink subframe 0 on the FDD carrier is the fourth subframe prior to a subframe 0 on the TDD carrier, that is, the uplink subframe 0 on the FDD carrier is used to transmit HARQ information corresponding to data of the fourth subframe prior to the subframe 0 on the TDD carrier. A downlink subframe corresponding to the uplink subframe 3 on the TDD carrier is the fourth subframe prior to the uplink subframe 3 on the TDD carrier, that is, the uplink subframe 3 on the TDD carrier is used to transmit HARQ information corresponding to data of the fourth subframe prior to the uplink subframe 3 on the TDD carrier. Others are similar, and details are not further described.

It can be learned that downlink data for the UE on the TDD carrier is still transmitted by using downlink subframes on the TDD carrier, but HARQ feedback information corresponding to the data may be transmitted by using certain uplink subframes on the FDD carrier and certain uplink subframes on the TDD carrier. For example, when the UL/DL configuration mode of the radio frame is UL/DL configuration mode 1, the UE may feed back HARQ information by using uplink subframes 0, 4, 5, and 9 on the FDD carrier and uplink subframes 3 and 8 on the TDD carrier.

Optionally, in another embodiment, the base station may determine resource parameters respectively corresponding to the Y uplink subframes, where a resource parameter corresponding to the $y^{th}$ uplink subframe of the Y uplink subframes is used to indicate a start position of a resource that is in the $y^{th}$ uplink subframe and that is used to transmit HARQ information, where y is a positive integer with a value ranging from 1 to Y. Then, the base station may send second signaling to the UE, where the second signaling includes the resource parameters respectively corresponding to the Y uplink subframes.

In addition to determining an uplink subframe corresponding to each downlink subframe on the TDD carrier, a resource parameter corresponding to each uplink subframe needs to be further determined. The resource parameter is used to indicate a start position of a resource that is in the uplink subframe corresponding to the source parameter and that is used to transmit HARQ information. Then the base station may notify, by using the second signaling, the UE of the resource parameters respectively corresponding to the uplink subframes. For example, the second signaling may be high-layer signaling. It should be noted that the resource parameters respectively corresponding to the uplink subframes may be the same or may be different.

In this embodiment, the resource parameters corresponding to the Y uplink subframes are determined, which can effectively avoid conflict in resources used for feeding back HARQ information and can increase flexibility in HARQ feedback.

Optionally, in another embodiment, when all the Y uplink subframes are uplink subframes on the FDD carrier, the base station may determine the resource parameters respectively corresponding to the Y uplink subframes according to related information of the FDD carrier, for example, a payload of the FDD carrier. In this case, the resource parameters respectively corresponding to the Y uplink subframes may be the same.

Optionally, in another embodiment, the Y uplink subframes include a first-type uplink subframe and a second-type uplink subframe, where the first-type uplink subframe is an uplink subframe on the FDD carrier, and the second-type uplink subframe is an uplink subframe on the TDD carrier. In this case, the base station may determine a resource parameter respectively corresponding to the first-type uplink subframe, and determine a resource parameter respectively corresponding to the second-type uplink subframe.

For example, the base station may determine resource parameters respectively corresponding to first-type uplink subframes according to related information of the FDD carrier, and may determine resource parameters respectively corresponding to second-type uplink subframes according to related information of the TDD carrier. For example, the base station may determine the resource parameters respectively corresponding to the first-type uplink subframes according to a payload of the FDD carrier, and may determine the resource parameters respectively corresponding to the second-type uplink subframes according to a payload of the TDD carrier. In this case, the resource parameters respectively corresponding to the first-type uplink subframes may be the same, for example, all being $N_{PUCCH}^{(1)}\_1$. The resource parameters respectively corresponding to the second-type uplink subframes may be the same, for example, all being $N_{PUCCH}^{(1)}\_2$. However, the payload of the FDD carrier and the payload of the TDD carrier may be different, and therefore, $N_{PUCCH}^{(1)}\_1$ and $N_{PUCCH}^{(1)}\_2$ may be different. Table 3 is used as an example for description. For example, when the UL/DL configuration mode of the radio frame is UL/DL configuration mode 1, uplink subframes 0, 4, 5, and 9 are uplink subframes on the FDD carrier, and they may all correspond to the resource parameter $N_{PUCCH}^{(1)}\_1$. Uplink subframes 3 and 8 are uplink subframes on the TDD carrier, and they may all correspond to the resource parameter $N_{PUCCH}^{(1)}\_2$.

Optionally, in another embodiment, the base station may further determine, according to the following equation (1) or (2), a position of a resource that is in the $y^{th}$ uplink subframe and used to transmit HARQ information.

$$n_{PUCCH\text{-}subframe(y)}^{(1,\tilde{p}0)} = n_{CCE} + N_{PUCCH\text{-}subframe(y)}^{(1)} \quad (1), \text{ or}$$

$$n_{PUCCH\text{-}subframe(y)}^{(1,\tilde{p}0)} = n_{CCE} + 1 + N_{PUCCH\text{-}subframe(y)}^{(1)} \quad (2)$$

$n_{PUCCH\text{-}subframe(y)}^{(1,\tilde{p}0)}$ represents the position of the resource that is in the $y^{th}$ uplink subframe and used to transmit HARQ information, $N_{PUCCH\text{-}subframe(y)}^{(1)}$ represents the resource parameter corresponding to the $y^{th}$ uplink subframe, and $n_{CCE}$ represents a number of the first control channel element (Control Channel Element, CCE) in a resource occupied by downlink control information that is used for scheduling the UE.

When a carrier payload is relatively large, $N_{PUCCH\text{-}subframe(y)}^{(1)}$ generally takes a relatively large value; and when a carrier payload is relatively small, $N_{PUCCH\text{-}subframe(y)}^{(1)}$ generally takes a relatively small value.

The equation (1) is applicable to a case in which the base station operates at an antenna port 0. The equation (2) is applicable to a case in which the base station operates at an antenna port 1.

Figure 4:
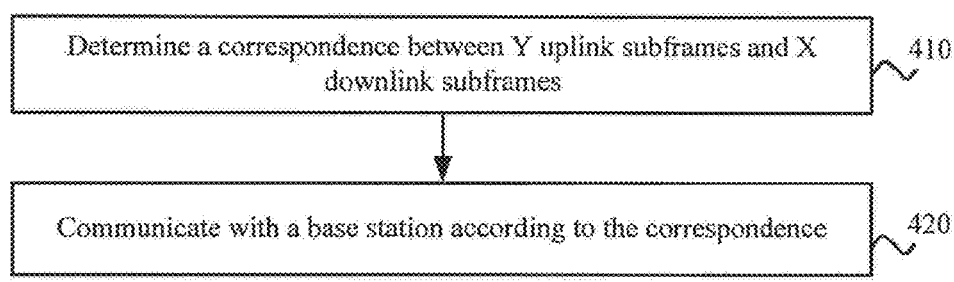
FIG. 4 is a schematic flowchart of a communication method according to another embodiment of the present invention.

FIG. 4 is a schematic flowchart of a communication method according to another embodiment of the present invention. The method of FIG. 4 is executed by UE, for example, the UE 120 in FIG. 1 or the UE 230 in FIG. 2. A process in FIG. 4 corresponds to the process in FIG. 3, and therefore, same descriptions are appropriately omitted.

410: Determine a correspondence between Y uplink subframes and X downlink subframes, where the Y uplink subframes are used to respectively transmit HARQ information that is corresponding to the X downlink subframes, at least one uplink subframe of the Y uplink subframes is an uplink subframe on an FDD carrier, the X downlink subframes are downlink subframes in one radio frame on a TDD carrier, and both X and Y are positive integers, and Y is a positive integer.

420: Communicate with a base station according to the correspondence.

In this embodiment of the present invention, a correspondence between Y uplink subframes and X downlink subframes is determined, where the X downlink subframes are downlink subframes on a TDD carrier, and at least one uplink subframe of the Y uplink subframes is an uplink subframe on an FDD carrier, so that HARQ information can be fed back for a downlink subframe on the TDD carrier in conjunction with an uplink subframe on the FDD carrier. This can improve performance in HARQ information feedback and can increase a system throughput.

Optionally, in an embodiment, the UE may receive first signaling from the base station, where the first signaling is used to indicate an UL/DL configuration mode of the radio frame, where the UL/DL configuration mode corresponds to the correspondence in a one-to-one manner. Then, the UE may determine the correspondence according to the UL/DL configuration mode.

As described in the embodiment of FIG. 3, the UL/DL configuration mode may correspond to one correspondence; therefore, the UE is notified of the UL/DL configuration mode, and the UE may uniquely determine a correspondence.

Optionally, in another embodiment, the Y uplink subframes may correspond to the X downlink subframes in a one-to-one manner.

Optionally, in another embodiment, in a case in which the Y uplink subframes correspond to the X downlink subframes in a one-to-one manner, all the Y uplink subframes may be uplink subframes on the FDD carrier.

Optionally, in another embodiment, if all the Y uplink subframes are uplink subframes on the FDD carrier, in a case in which the UL/DL configuration mode of the radio frame is the following UL/DL configuration mode, the correspondence between the Y uplink subframes and the X downlink subframes may be shown in Table 2.

Optionally, in another embodiment, in a case in which the Y uplink subframes correspond to the X downlink subframes in a one-to-one manner, the Y uplink subframes may include a first-type uplink subframe and a second-type uplink subframe, where the first-type uplink subframe is an uplink subframe on the FDD carrier, and the second-type uplink subframe is an uplink subframe on the TDD carrier.

Optionally, in another embodiment, if the Y uplink subframes include a first-type uplink subframe and a second-type uplink subframe, in a case in which the UL/DL configuration mode of the radio frame is the following UL/DL configuration mode, the correspondence between the Y uplink subframes and the X downlink subframes may be shown in Table 3.

Optionally, in another embodiment, before step 420, the UE may receive second signaling from the base station, where the second signaling includes resource parameters respectively corresponding to the Y uplink subframes, and a resource parameter corresponding to the $y^{th}$ uplink subframe of the Y uplink subframes is used to indicate a start position of a resource that is in the $y^{th}$ uplink subframe and that is used to transmit HARQ information, where y is a positive integer with a value ranging from 1 to Y. The UE may communicate with the base station according to the correspondence and the resource parameters respectively corresponding to the Y uplink subframes.

Optionally, in another embodiment, the UE may further determine, according to the equation (1) or (2), a position of a resource that is in the $y^{th}$ uplink subframe and used to transmit HARQ information. In this way, the UE may feed back corresponding HARQ information to the base station at the determined resource position.

Figure 5:
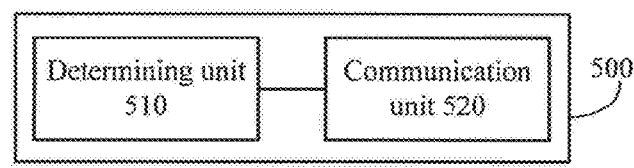
FIG. 5 is a schematic block diagram of abase station according to an embodiment of the present invention.

FIG. 5 is a schematic block diagram of a base station according to an embodiment of the present invention. For example, the base station 500 of FIG. 5 may be the macro base station 110 shown in FIG. 1, or may be the macro base station 210 or the micro base station 220 shown in FIG. 2. The base station 500 includes a determining unit 510 and a communication unit 520.

The determining unit 510 determines a correspondence between Y uplink subframes and X downlink subframes, where the Y uplink subframes are used to respectively transmit HARQ information that is corresponding to the X downlink subframes, at least one uplink subframe of the Y uplink subframes is an uplink subframe on an FDD carrier, the X downlink subframes are downlink subframes in one radio frame on a TDD carrier, and both X and Y are positive integers. The communication unit 520 communicates with UE according to the correspondence.

In this embodiment of the present invention, a correspondence between Y uplink subframes and X downlink subframes is determined, where the X downlink subframes are downlink subframes on a TDD carrier, and at least one uplink subframe of the Y uplink subframes is an uplink subframe on an FDD carrier, so that HARQ information can be fed back for a downlink subframe on the TDD carrier in conjunction with an uplink subframe on the FDD carrier. This can improve performance in HARQ information feedback and can increase a system throughput.

Optionally, in an embodiment, the determining unit 510 may determine an UL/DL configuration mode of the radio frame, where the UL/DL configuration mode corresponds to the correspondence in a one-to-one manner.

Optionally, in another embodiment, before communicating with the UE according to the correspondence, the communication unit 520 may send first signaling to the UE, where the first signaling is configured to indicate the UL/DL configuration mode.

Optionally, in another embodiment, the Y uplink subframes may correspond to the X downlink subframes in a one-to-one manner.

Optionally, in another embodiment, all the Y uplink subframes may be uplink subframes on the FDD carrier.

In a case in which the UL/DL configuration mode of the radio frame is the following UL/DL configuration mode, the correspondence between the Y uplink subframes and the X downlink subframes may be shown in Table 2.

Optionally, in another embodiment, the Y uplink subframes may include a first-type uplink subframe and a second-type uplink subframe, where the first-type uplink subframe is an uplink subframe on the FDD carrier, and the second-type uplink subframe is an uplink subframe on the TDD carrier.

In a case in which the UL/DL configuration mode of the radio frame is the following UL/DL configuration mode, the correspondence between the Y uplink subframes and the X downlink subframes may be shown in Table 3.

Optionally, in another embodiment, the determining unit 510 may further determine resource parameters respectively corresponding to the Y uplink subframes, where a resource parameter corresponding to the $y^{th}$ uplink subframe of the Y uplink subframes is used to indicate a start position of a resource that is in the $y^{th}$ uplink subframe and that is used to transmit HARQ information, where y is a positive integer with a value ranging from 1 to Y. The communication unit 520 may further send second signaling to the UE, where the second signaling includes the resource parameters respectively corresponding to the Y uplink subframes.

Optionally, in another embodiment, the determining unit 510 may further determine, according to the equation (1) or (2), a position of a resource that is in the $y^{th}$ uplink subframe and used to transmit HARQ information.

For other functions and operations of the base station 500, reference may be made to the base station-involved process in the method embodiment of FIG. 3, and details are not described to avoid repetition.

Figure 6:
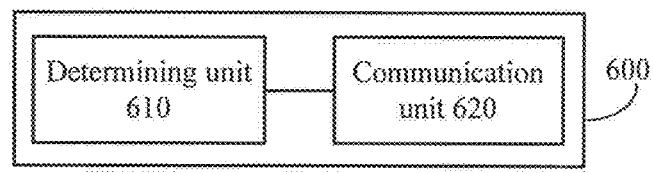
FIG. 6 is a schematic block diagram of UE according to an embodiment of the present invention.

FIG. 6 is a schematic block diagram of UE according to an embodiment of the present invention. For example, the UE 600 of FIG. 6 may be the UE 120 shown in FIG. 1 or the UE 230 shown in FIG. 2. The UE 600 includes a determining unit 610 and a communication unit 620.

The determining unit 610 determines a correspondence between Y uplink subframes and X downlink subframes, where the Y uplink subframes are used to respectively transmit HARQ information that is corresponding to the X downlink subframes, at least one uplink subframe of the Y uplink subframes is an uplink subframe on an FDD carrier, the X downlink subframes are downlink subframes in one radio frame on a TDD carrier, and both X and Y are positive integers. The communication unit 620 communicates with a base station according to the correspondence.

In this embodiment of the present invention, a correspondence between Y uplink subframes and X downlink subframes is determined, where the X downlink subframes are downlink subframes on a TDD carrier, and at least one uplink subframe of the Y uplink subframes is an uplink subframe on an FDD carrier, so that HARQ information can be fed back for a downlink subframe on the TDD carrier in conjunction with an uplink subframe on the FDD carrier. This can improve performance in HARQ information feedback and can increase a system throughput.

Optionally, in an embodiment, the communication unit 620 may further receive first signaling from the base station, where the first signaling is used to indicate an uplink UL/downlink DL configuration mode of the radio frame, where the UL/DL configuration mode corresponds to the correspondence in a one-to-one manner. The determining unit 610 may further determine the correspondence according to the UL/DL configuration mode.

Optionally, in another embodiment, the Y uplink subframes may correspond to the X downlink subframes in a one-to-one manner.

Optionally, in another embodiment, all the Y uplink subframes may be uplink subframes on the FDD carrier.

In a case in which the UL/DL configuration mode of the radio frame is the following UL/DL configuration mode, the correspondence between the Y uplink subframes and the X downlink subframes may be shown in Table 2.

Optionally, in another embodiment, the Y uplink subframes include a first-type uplink subframe and a second-type uplink subframe, where the first-type uplink subframe is an uplink subframe on the FDD carrier, and the second-type uplink subframe is an uplink subframe on the TDD carrier.

In a case in which the UL/DL configuration mode of the radio frame is the following UL/DL configuration mode, the correspondence between the Y uplink subframes and the X downlink subframes may be shown in Table 3.

Optionally, in another embodiment, the communication unit 620 may further receive second signaling from the base station, where the second signaling includes resource parameters respectively corresponding to the Y uplink subframes. A resource parameter corresponding to the $y^{th}$ uplink subframe of the Y uplink subframes is used to indicate a start position of a resource that is in the $y^{th}$ uplink subframe and that is used to transmit HARQ information, where y is a positive integer with a value ranging from 1 to Y. The communication unit 620 may communicate with the base station according to the correspondence and the resource parameters respectively corresponding to the Y uplink subframes.

Optionally, in another embodiment, the determining unit 610 may further determine, according to the equation (1) or (2), a position of a resource that is in the $y^{th}$ uplink subframe and used to transmit HARQ information.

For other functions and operations of the UE 600, reference may be made to the UE-involved process in the method embodiment of FIG. 4, and details are not described to avoid repetition.

Figure 7:
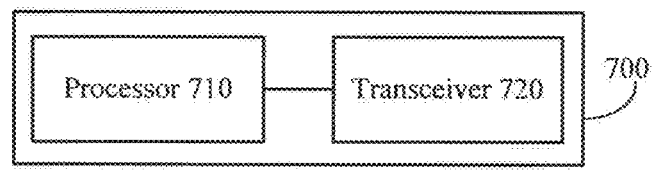
FIG. 7 is a schematic block diagram of a base station according to another embodiment of the present invention.

FIG. 7 is a schematic block diagram of a base station according to another embodiment of the present invention. For example, the base station 700 of FIG. 7 may be the macro base station 110 shown in FIG. 1, or may be the macro base station 210 or the micro base station 220 shown in FIG. 2. The base station 700 includes a processor 710 and a transceiver 720.

The processor 710 determines a correspondence between Y uplink subframes and X downlink subframes, where the Y uplink subframes are used to respectively transmit HARQ information that is corresponding to the X downlink subframes, at least one uplink subframe of the Y uplink subframes is an uplink subframe on an FDD carrier, the X downlink subframes are downlink subframes in one radio frame on a TDD carrier, and both X and Y are positive integers. The transceiver 720 communicates with UE according to the correspondence.

In this embodiment of the present invention, a correspondence between Y uplink subframes and X downlink subframes is determined, where the X downlink subframes are downlink subframes on a TDD carrier, and at least one uplink subframe of the Y uplink subframes is an uplink subframe on an FDD carrier, so that HARQ information can be fed back for a downlink subframe on the TDD carrier in conjunction with an uplink subframe on the FDD carrier. This can improve performance in HARQ information feedback and can increase a system throughput.

Optionally, in an embodiment, the processor 710 may determine an UL/DL configuration mode of the radio frame, where the UL/DL configuration mode corresponds to the correspondence in a one-to-one manner.

Optionally, in another embodiment, before communicating with the UE according to the correspondence, the transceiver 720 may send first signaling to the UE, where the first signaling is configured to indicate the UL/DL configuration mode.

Optionally, in another embodiment, the Y uplink subframes may correspond to the X downlink subframes in a one-to-one manner.

Optionally, in another embodiment, all the Y uplink subframes may be uplink subframes on the FDD carrier.

In a case in which the UL/DL configuration mode of the radio frame is the following UL/DL configuration mode, the correspondence between the Y uplink subframes and the X downlink subframes may be shown in Table 2.

Optionally, in another embodiment, the Y uplink subframes may include a first-type uplink subframe and a second-type uplink subframe, where the first-type uplink subframe is an uplink subframe on the FDD carrier, and the second-type uplink subframe is an uplink subframe on the TDD carrier.

In a case in which the UL/DL configuration mode of the radio frame is the following UL/DL configuration mode, the correspondence between the Y uplink subframes and the X downlink subframes may be shown in Table 3.

Optionally, in another embodiment, the processor 710 may further determine resource parameters respectively corresponding to the Y uplink subframes, where a resource parameter corresponding to the $y^{th}$ uplink subframe of the Y uplink subframes is used to indicate a start position of a resource that is in the $y^{th}$ uplink subframe and that is used to transmit HARQ information, where y is a positive integer with a value ranging from 1 to Y. The transceiver 720 may further send second signaling to the UE, where the second signaling includes the resource parameters respectively corresponding to the Y uplink subframes.

Optionally, in another embodiment, the processor 710 may further determine, according to the equation (1) or (2), a position of a resource that is in the $y^{th}$ uplink subframe and used to transmit HARQ information.

For other functions and operations of the base station 700, reference may be made to the base station-involved process in the method embodiment of FIG. 3, and details are not described to avoid repetition.

Figure 8:
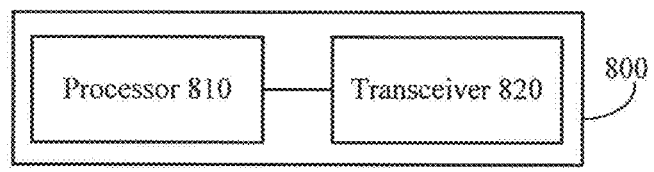
FIG. 8 is a schematic block diagram of UE according to another embodiment of the present invention.

FIG. 8 is a schematic block diagram of UE according to another embodiment of the present invention. For example, the UE 800 of FIG. 8 may be the UE 120 shown in FIG. 1 or the UE 230 shown in FIG. 2. The UE 800 includes a processor 810 and a transceiver 820.

The processor 810 determines a correspondence between Y uplink subframes and X downlink subframes, where the Y uplink subframes are used to respectively transmit HARQ information that is corresponding to the X downlink subframes, at least one uplink subframe of the Y uplink subframes is an uplink subframe on an FDD carrier, the X downlink subframes are downlink subframes in one radio frame on a TDD carrier, and both X and Y are positive integers. The transceiver 820 communicates with a base station according to the correspondence.

In this embodiment of the present invention, a correspondence between Y uplink subframes and X downlink subframes is determined, where the X downlink subframes are downlink subframes on a TDD carrier, and at least one uplink subframe of the Y uplink subframes is an uplink subframe on an FDD carrier, so that HARQ information can be fed back for a downlink subframe on the TDD carrier in conjunction with an uplink subframe on the FDD carrier. This can improve performance in HARQ information feedback and can increase a system throughput.

Optionally, in an embodiment, the transceiver 820 may further receive first signaling from the base station, where the first signaling is used to indicate an UL/DL configuration mode of the radio frame, where the UL/DL configuration mode corresponds to the correspondence in a one-to-one manner. The processor 810 may further determine the correspondence according to the UL/DL configuration mode.

Optionally, in another embodiment, the Y uplink subframes may correspond to the X downlink subframes in a one-to-one manner.

Optionally, in another embodiment, all the Y uplink subframes may be uplink subframes on the FDD carrier.

In a case in which the UL/DL configuration mode of the radio frame is the following UL/DL configuration mode, the correspondence between the Y uplink subframes and the X downlink subframes may be shown in Table 2.

Optionally, in another embodiment, the Y uplink subframes include a first-type uplink subframe and a second-type uplink subframe, where the first-type uplink subframe is an uplink subframe on the FDD carrier, and the second-type uplink subframe is an uplink subframe on the TDD carrier.

In a case in which the UL/DL configuration mode of the radio frame is the following UL/DL configuration mode, the correspondence between the Y uplink subframes and the X downlink subframes may be shown in Table 3.

Optionally, in another embodiment, the transceiver 820 may further receive second signaling from the base station, where the second signaling includes resource parameters respectively corresponding to the Y uplink subframes. A resource parameter corresponding to the $y^{th}$ uplink subframe of the Y uplink subframes is used to indicate a start position of a resource that is in the $y^{th}$ uplink subframe and that is used to transmit HARQ information, where y is a positive integer with a value ranging from 1 to Y. The transceiver 820 may communicate with the base station according to the correspondence and the resource parameters respectively corresponding to the Y uplink subframes.

Optionally, in another embodiment, the processor 810 may further determine, according to the equation (1) or (2), a position of a resource that is in the $y^{th}$ uplink subframe and used to transmit HARQ information.

For other functions and operations of the UE 800, reference may be made to the UE-involved process in the method embodiment of FIG. 4, and details are not described to avoid repetition.

A person of ordinary skill in the art may be aware that the exemplary units and algorithm steps described with reference to the embodiments disclosed herein may be implemented by electronic hardware or a combination of computer software and electronic hardware. Whether the functions are implemented by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions to cause a computer device (which may be a personal computer, a server, or a network device) to perform all or some of the steps of the methods described in the embodiments of the present invention. The foregoing storage medium includes: any medium that can store program code, such as a USB flash drive, a portable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
   determining a correspondence between Y uplink subframes and X downlink subframes, wherein the Y uplink subframes are configured for transmission of hybrid automatic repeat request (HARD) information corresponding to the X downlink subframes, at least one uplink subframe of the Y uplink subframes is an uplink subframe on a frequency division duplex (FDD) carrier, the X downlink subframes are downlink subframes in one radio frame on a time division duplex (TDD) carrier, and both X and Y are positive integers; and communicating with user equipment (UE) according to the correspondence, wherein the Y uplink subframes comprise a first-type uplink subframe and a second-type uplink subframe, the first-type uplink subframe is an uplink subframe on the FDD carrier, the second-type uplink subframe is an uplink subframe on the TDD carrier, and when a UL/DL configuration mode of the radio frame is any one of the following UL/DL configuration modes, the correspondence between the Y uplink subframes and the X downlink subframes is as follows:

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F | | | | 4 | 4,F | | | | 4 |
| 1 | 4,F | | | 4 | 4,F | 4,F | | | 4 | 4,F |
| 2 | 4,F | | 4 | 4,F | 4,F | 4,F | | 4 | 4,F | 4,F |
| 3 | 4,F | 4,F | 4 | 4 | 4 | 4,F | | | | 4,F |
| 4 | 4,F | 4,F | 4 | 4 | 4,F | 4,F | | | 4,F | 4,F |
| 5 | 4,F | 4,F | 4 | 4,F | 4,F | 4,F | | 4,F | 4,F | 4,F |
| 6 | 4,F | | | 4 | 4 | 4,F | | | | 4,F | wherein an uplink subframe n corresponding to "4,F" belongs to the first-type uplink subframe, "4,F" indicates that a downlink subframe corresponding to the uplink subframe n is a fourth subframe prior to a subframe n on the TDD carrier, an uplink subframe n corresponding to "4" belongs to the second-type uplink subframe, "4" indicates that a downlink subframe corresponding to the uplink subframe n is the fourth subframe prior to a subframe n on the TDD carrier, and n is any element in a set {0,1,2,3,4,5,6,7,8,9}.

2. The method according to claim 1, further comprising:
determining resource parameters corresponding to the Y uplink subframes, wherein a resource parameter corresponding to a $y^{th}$ uplink subframe of the Y uplink subframes indicates a start position of a resource in the $y^{th}$ uplink subframe and is for transmitting HARQ information, wherein y is a positive integer with a value ranging from 1 to Y; and
sending signaling to the UE, wherein the signaling comprises the resource parameters corresponding to the Y uplink subframes.

3. The method according to claim 2, wherein:
determining resource parameters corresponding to the Y uplink subframes comprises:
determining a resource parameter corresponding to the first-type uplink subframe, and determining a resource parameter corresponding to the second-type uplink subframe.

4. The method according to claim 2, further comprising:
determining, according to the following equation, a position of a resource in the $y^{th}$ uplink subframe, the resource for transmitting HARQ information:

$$n_{PUCCH\text{-}subframe(y)}^{(1,\tilde{p}0)} = n_{CCE} + N_{PUCCH\text{-}subframe(y)}^{(1)},$$
or $$n_{PUCCH\text{-}subframe(y)}^{(1,\tilde{p}0)} = n_{CCE} + 1 + N_{PUCCH\text{-}subframe(y)}^{(1)},$$

wherein $n_{PUCCH\text{-}subframe(y)}^{(1,\tilde{p}0)}$ represents the position of the resource that is in the $y^{th}$ uplink subframe and for transmitting HARQ information, $N_{PUCCH\text{-}subframe(y)}^{(1)}$ represents the resource parameter corresponding to the $y^{th}$ uplink subframe, and $n_{CCE}$ represents a number of a first control channel element (CCE) in a resource occupied by downlink control information for scheduling the UE.

5. A communication method, comprising:
determining a correspondence between Y uplink subframes and X downlink subframes, wherein the Y uplink subframes are configured for transmission of hybrid automatic repeat request (HARQ) information corresponding to the X downlink subframes, at least one uplink subframe of the Y uplink subframes is an uplink subframe on a frequency division duplex (FDD) carrier, the X downlink subframes are downlink subframes in one radio frame on a time division duplex (TDD) carrier, and both X and Y are positive integers; and communicating with a base station according to the correspondence, wherein the Y uplink subframes comprise a first-type uplink subframe and a second-type uplink subframe, the first-type uplink subframe is an uplink subframe on the FDD carrier, the second-type uplink subframe is an uplink subframe on the TDD carrier, and when a UL/DL configuration mode of the radio frame is any one of the following UL/DL configuration modes, the correspondence between the Y uplink subframes and the X downlink subframes is as follows:

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F | | | | 4 | 4,F | | | | 4 |
| 1 | 4,F | | | 4 | 4,F | 4,F | | | 4 | 4,F |
| 2 | 4,F | | 4 | 4,F | 4,F | 4,F | | 4 | 4,F | 4,F |
| 3 | 4,F | 4,F | 4 | 4 | 4 | 4,F | | | | 4,F |
| 4 | 4,F | 4,F | 4 | 4 | 4,F | 4,F | | | 4,F | 4,F |
| 5 | 4,F | 4,F | 4 | 4,F | 4,F | 4,F | | 4,F | 4,F | 4,F |
| 6 | 4,F | | | 4 | 4 | 4,F | | | | 4,F | wherein an uplink subframe n corresponding to "4,F" belongs to the first-type uplink subframe, "4,F" indicates that a downlink subframe corresponding to the uplink subframe n is a fourth subframe prior to a subframe n on the TDD carrier, an uplink subframe n corresponding to "4" belongs to the second-type uplink subframe, "4" indicates that a downlink subframe corresponding to the uplink subframe n is the fourth subframe prior to a subframe n on the TDD carrier, and n is any element in a set {0,1,2,3,4,5,6,7,8,9}.

6. The method according to claim 5, further comprising:
receiving signaling from the base station, wherein the signaling comprises resource parameters corresponding to the Y uplink subframes, and a resource parameter corresponding to a $y^{th}$ uplink subframe of the Y uplink subframes indicates a start position of a resource in the $y^{th}$ uplink subframe and is for transmitting HARQ information, wherein y is a positive integer with a value ranging from 1 to Y; and communicating with a base station according to the correspondence comprises:
  communicating with the base station according to the correspondence and the resource parameters corresponding to the Y uplink subframes.

7. The method according to claim 6, further comprising: determining, according to the following equation, a position of a resource in the $y^{th}$ uplink subframe, the resource for transmitting HARQ information:

$$n_{PUCCH\text{-}subframe(y)}^{(1,\tilde{p}0)} = n_{CCE} + N_{PUCCH\text{-}subframe(y)}^{(1)},$$

or $$n_{PUCCH\text{-}subframe(y)}^{(1,\tilde{p}0)} = n_{CCE} + 1 + N_{PUCCH\text{-}subframe(y)}^{(1)},$$

wherein $n_{PUCCH\text{-}subframe(y)}^{(1,\tilde{p}0)}$ represents the position of the resource that is in the $y^{th}$ uplink subframe and for transmitting HARQ information, $N_{PUCCH\text{-}subframe(y)}^{(1)}$ represents the resource parameter corresponding to the $y^{th}$ uplink subframe, and $n_{CCE}$ represents a number of a first control channel element (CCE) in a resource occupied by downlink control information for scheduling.

8. A device, comprising:
a processor, configured to determine a correspondence between Y uplink subframes and X downlink subframes, wherein the Y uplink subframes are configured for transmission of hybrid automatic repeat request (HARQ) information corresponding to the X downlink subframes, at least one uplink subframe of the Y uplink subframes is an uplink subframe on a frequency division duplex (FDD) carrier, the X downlink subframes are downlink subframes in one radio frame on a time division duplex (TDD) carrier, and both X and Y are positive integers; and
a transceiver, configured to communicate with a base station according to the correspondence,
wherein the Y uplink subframes comprise a first-type uplink subframe and a second-type uplink subframe, the first-type uplink subframe is an uplink subframe on the FDD carrier, the second-type uplink subframe is an uplink subframe on the TDD carrier, and when a UL/DL configuration mode of the radio frame is any one of the following UL/DL configuration modes, the correspondence between the Y uplink subframes and the X downlink subframes is as follows:

| UL/DL configuration mode | Uplink subframe n | | | | | | | | | |
|---|---|---|---|---|---|---|---|---|---|---|
| | 0 | 1 | 2 | 3 | 4 | 5 | 6 | 7 | 8 | 9 |
| 0 | 4,F | | | 4 | 4,F | | | | | 4 |
| 1 | 4,F | | 4 | 4,F | 4,F | | | 4 | | 4,F |
| 2 | 4,F | | 4 | 4,F | 4,F | 4,F | | 4 | 4,F | 4,F |
| 3 | 4,F | 4,F | 4 | 4 | 4 | 4,F | | | | 4,F |
| 4 | 4,F | 4,F | 4 | 4 | 4,F | 4,F | | | 4,F | 4,F |
| 5 | 4,F | 4,F | 4 | 4,F | 4,F | 4,F | | 4,F | 4,F | 4,F |
| 6 | 4,F | | | 4 | 4 | 4,F | | | | 4,F | wherein an uplink subframe n corresponding to "4,F" belongs to the first-type uplink subframe, "4,F" indicates that a downlink subframe corresponding to the uplink subframe n is a fourth subframe prior to a subframe n on the TDD carrier, an uplink subframe n corresponding to "4" belongs to the second-type uplink subframe, "4" indicates that a downlink subframe corresponding to the uplink subframe n is the fourth subframe prior to a subframe n on the TDD carrier, and n is any element in a set {0,1,2,3,4,5,6,7,8,9}.

9. The device according to claim 8, wherein the transceiver is further configured to:
receive signaling from the base station, wherein the signaling comprises resource parameters corresponding to the Y uplink subframes, and a resource parameter corresponding to a $y^{th}$ uplink subframe of the Y uplink subframes indicates a start position of a resource in the $y^{th}$ uplink subframe and is for transmitting HARQ information, wherein y is a positive integer with a value ranging from 1 to Y; and
communicate with the base station according to the correspondence and the resource parameters corresponding to the Y uplink subframes.

10. The device according to claim 9, wherein the processor is further configured to determine, according to the following equation, a position of a resource in the $y^{th}$ uplink subframe, the resource for transmitting HARQ information:

$$n_{PUCCH\text{-}subframe(y)}^{(1,\tilde{p}0)} = n_{CCE} + N_{PUCCH\text{-}subframe(y)}^{(1)},$$

or $$n_{PUCCH\text{-}subframe(y)}^{(1,\tilde{p}0)} = n_{CCE} + 1 + N_{PUCCH\text{-}subframe(y)}^{(1)},$$

wherein $n_{PUCCH\text{-}subframe(y)}^{(1,\tilde{p}0)}$ represents the position of the resource that is in the $y^{th}$ uplink subframe and for transmitting HARQ information, $n_{PUCCH\text{-}subframe(y)}^{(1)}$ represents the resource parameter corresponding to the $y^{th}$ uplink subframe, and $n_{CCE}$ represents a number of a first control channel element (CCE) in a resource occupied by downlink control information for scheduling.

* * * * *